(12) United States Patent
Campbell

(10) Patent No.: US 10,190,639 B2
(45) Date of Patent: Jan. 29, 2019

(54) SENSOR UNIT FOR A BEARING

(71) Applicant: Aktiebolaget SKF, Goteborg (SE)

(72) Inventor: Andrew Campbell, East Kilbride (GB)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/680,936

(22) Filed: Aug. 18, 2017

(65) Prior Publication Data

US 2018/0058504 A1    Mar. 1, 2018

(30) Foreign Application Priority Data

Aug. 26, 2016 (DE) .................. 10 2016 216 112

(51) Int. Cl.
| | | |
|---|---|---|
| *F16C 41/00* | (2006.01) | |
| *F16C 35/04* | (2006.01) | |
| *F16C 19/52* | (2006.01) | |
| *F16C 33/78* | (2006.01) | |
| *F16C 43/04* | (2006.01) | |

(52) U.S. Cl.
CPC .......... *F16C 35/042* (2013.01); *F16C 19/525* (2013.01); *F16C 19/527* (2013.01); *F16C 33/7886* (2013.01); *F16C 41/00* (2013.01); *F16C 43/04* (2013.01); *F16C 2233/00* (2013.01); *F16C 2360/31* (2013.01)

(58) Field of Classification Search
CPC .......................... F16C 2233/00; G01M 13/045
See application file for complete search history.

(56) References Cited

U.S. PATENT DOCUMENTS

| | | | | |
|---|---|---|---|---|
| 6,161,962 A | * | 12/2000 | French ................... | B61F 15/20 384/448 |
| 9,733,154 B2 | * | 8/2017 | Campbell ........... | G01M 13/045 |
| 2012/0192391 A1 | * | 8/2012 | Tobinaga .............. | F03D 7/0224 29/23.51 |
| 2016/0312835 A1 | * | 10/2016 | Nicolas .................. | G01D 5/244 |

* cited by examiner

*Primary Examiner* — Thomas R Hannon
(74) *Attorney, Agent, or Firm* — Bryan Peckjian; SKF USA Inc. Patent Dept.

(57) ABSTRACT

A sensor unit for a bearing includes a main body, a sensor holder and a mounting bracket. The sensor holder has a measurement surface in a first plane on which at least one sensor is provided for measuring an operating parameter of the bearing. Each mounting bracket has an attachment portion having an attachment surface. The sensor unit is configured to contact the bearing ring that forms part of an assembly in which the bearing is mounted. The sensor holder has one or more extendable legs that are extendable in a longitudinal direction perpendicular to the first plane, such that the measurement surface is adjustable in longitudinal direction relative to the main body. The mounting brackets are linearly movable and pivotable relative to the main body. The sensor unit has a first attachment position and a second attachment position.

14 Claims, 5 Drawing Sheets

SENSOR UNIT FOR A BEARING

CROSS REFERENCE TO RELATED APPLICATIONS

This application claims priority to German patent application no. 102016216112.1 filed on Aug. 26, 2016, the contents of which are fully incorporated herein by reference.

FIELD OF THE INVENTION

The invention relates to a sensor unit for measuring one or more operating parameters of a machine component, such as a bearing that supports a main shaft of a wind turbine.

BACKGROUND OF THE INVENTION

The main shaft bearings of a wind turbine are critical components, which are expensive to replace if early failure occurs. Consequently, condition monitoring is often applied, whereby operating parameters of the bearing, such as temperature and vibration, are measured in order to send a maintenance alert if the measured values exceed predefined thresholds.

An example of a bearing assembly comprising a sensor unit embedded in a bearing ring of the assembly is disclosed in US 2016/0047715. A recess is machined into the bearing ring, which recess is sufficiently large to accommodate a housing of the sensor unit which, in addition to multiple sensors, includes electronics for processing and transmitting signals received from the sensors.

In some applications, however, it may not be possible or advisable to machine a recess of the requisite depth into the bearing ring. Consequently, there is room for improvement in terms of providing a sensor unit that is suitable for different types of bearings and bearing arrangements which support the main shaft of a wind turbine.

BRIEF SUMMARY OF THE INVENTION

It is an object of the present invention to define a sensor unit for a bearing, which has adjustable mounting configurations, such that the same type of sensor unit can be securely mounted to different types of bearings and bearing arrangements. This object is achieved by means of a sensor unit as defined in claim 1.

Specifically, the sensor unit provides a main body, a sensor holder and one or more mounting brackets, whereby the sensor holder has a measurement surface in a first plane on which at least one sensor is provided for measuring an operating parameter of a bearing when in contact with a ring of the bearing. Furthermore, each mounting bracket provides an attachment portion having an attachment surface, which in use of the sensor unit, is configured to be in contact with the bearing ring or a further ring which forms part of an assembly in which the bearing is mounted.

The sensor holder provides one or more extendable legs, which are extendable in a longitudinal direction perpendicular to the first plane, such that the measurement surface is adjustable in longitudinal direction relative to the main body. In addition, the one or more mounting brackets are linearly movable and pivotable relative to the main body. As a result, the sensor unit has a first attachment position, in which the measurement surface and the attachment surface lie on parallel planes and the attachment surface is adjustable in longitudinal direction relative to the main body; and has a second attachment position in which the measurement surface and attachment surface lie in perpendicular planes and the attachment surface is adjustable in a transverse direction relative to the main body of the sensor unit.

Suitably, each extendable leg has a foot portion which provides a measurement surface and one or more sensors selected from a temperature sensor, a vibration sensor, an acoustic emission sensor and a deformation sensor.

In a preferred embodiment, the sensor holder provides two extendable legs, whereby the foot portion of one leg contains a deformation sensor and the foot portion of the other leg contains a temperature sensor, a vibration sensor and an acoustic emission sensor. Advantageously, at least one spring which is compressible in longitudinal direction is provided between the measurement surface and the sensor holder, so that in use of the sensor unit, the measurement surface can be spring loaded.

In an embodiment, the main body of the sensor unit contains space for accommodating a portion of each extendable leg of the sensor holder, such that said portion is housed within the main body of the sensor unit when the sensor holder is in a partially extended or non-extended position. For extending and retracting the sensor holder, the sensor unit is advantageously provided with a screw mechanism and the sensor holder provides means for engaging with the screw mechanism. In one example, where the sensor holder provides a plurality of extendable legs, the legs are interconnected by a connecting portion and a threaded opening is provided in the connecting portion.

In an embodiment, each of the one or more mounting brackets provides an arm from which the attachment portion extends at an angle of about 90 degrees, whereby the main body provides at least one threaded hole for enabling each arm to be screwed to the main body, such that the sensor unit can be fixed in the first attachment position or in the second attachment position. Preferably, the sensor unit provides two mounting brackets.

In an embodiment, the arm of each mounting bracket provides a longitudinal slot with a width that is slightly larger than the shank, but smaller than the head of a screw that is used to fix the mounting bracket to the main body of the sensor unit. The longitudinal slot enables the fixation position of the bracket on the main body to be adjusted in linear direction. Preferably, the main body provides first and second threaded holes arranged in longitudinal direction, for the fixation of each arm, such that in the first attachment position, each mounting bracket can be fixed to the main body via two screws. The main body may also provides a third threaded hole, arranged in transverse direction to the first threaded hole, such that in the second attachment position, each mounting bracket can be fixed to the main body via two screws.

The attachment portion of each mounting bracket may comprise at least one magnet for attaching the sensor unit to the bearing ring or further ring of the assembly. Such an attachment will suffice if the sensor unit need only be mounted for a relatively short period. A more secure attachment is advisable for long-term use of the sensor unit, in which case the attachment portion of each mounting bracket is suitably provided with a hole for receiving a bolt.

The sensor unit of the invention is suitable for use in applications where it is not desirable to drill into the bearing ring.

In one example, the sensor unit is mounted to a bearing assembly comprising a bearing ring and a further ring arranged at an axial distance from the bearing ring. The further ring is provided with an axially extending through hole for each extendable leg of the sensor holder. The sensor unit is mounted in the first attachment position, whereby the measurement surface bears against an axial side face of the bearing ring, while the attachment surface of the one or more mounting brackets bears against an axially outer surface of the further ring. The sensor unit can thus be bolted to the further ring.

In another example, the sensor unit is mounted in an assembly comprising a bearing ring and a further ring having a radially outer portion in axial abutment with a radially inner portion of the bearing ring. The sensor unit is mounted in the second attachment position, whereby the measurement surface of the sensor unit is in contact with a side face of a radially outer portion of the bearing ring, while the attachment surface of the one or more mounting brackets is in contact with a cylindrical outer surface of the further ring. The sensor unit can thus be bolted to the further ring.

In a still further example, where drilling into the bearing ring is not problematic, the sensor unit is mounted to a side face of the bearing ring. To enable measurement to take place closer to a rolling contact region of the bearing ring, the side face provides at least one recess into which the sensor holder extends, such that the measurement surface is in contact with a bottom surface of the recess. The attachment surface of the one or more mounting brackets is in contact with the bearing ring side face.

A sensor unit according to the invention is thus a versatile device that can be applied in many different bearing arrangements. Other advantages will become apparent from the following detailed description and accompanying drawings.

DETAILED DESCRIPTION OF THE INVENTION

Figure 1A:
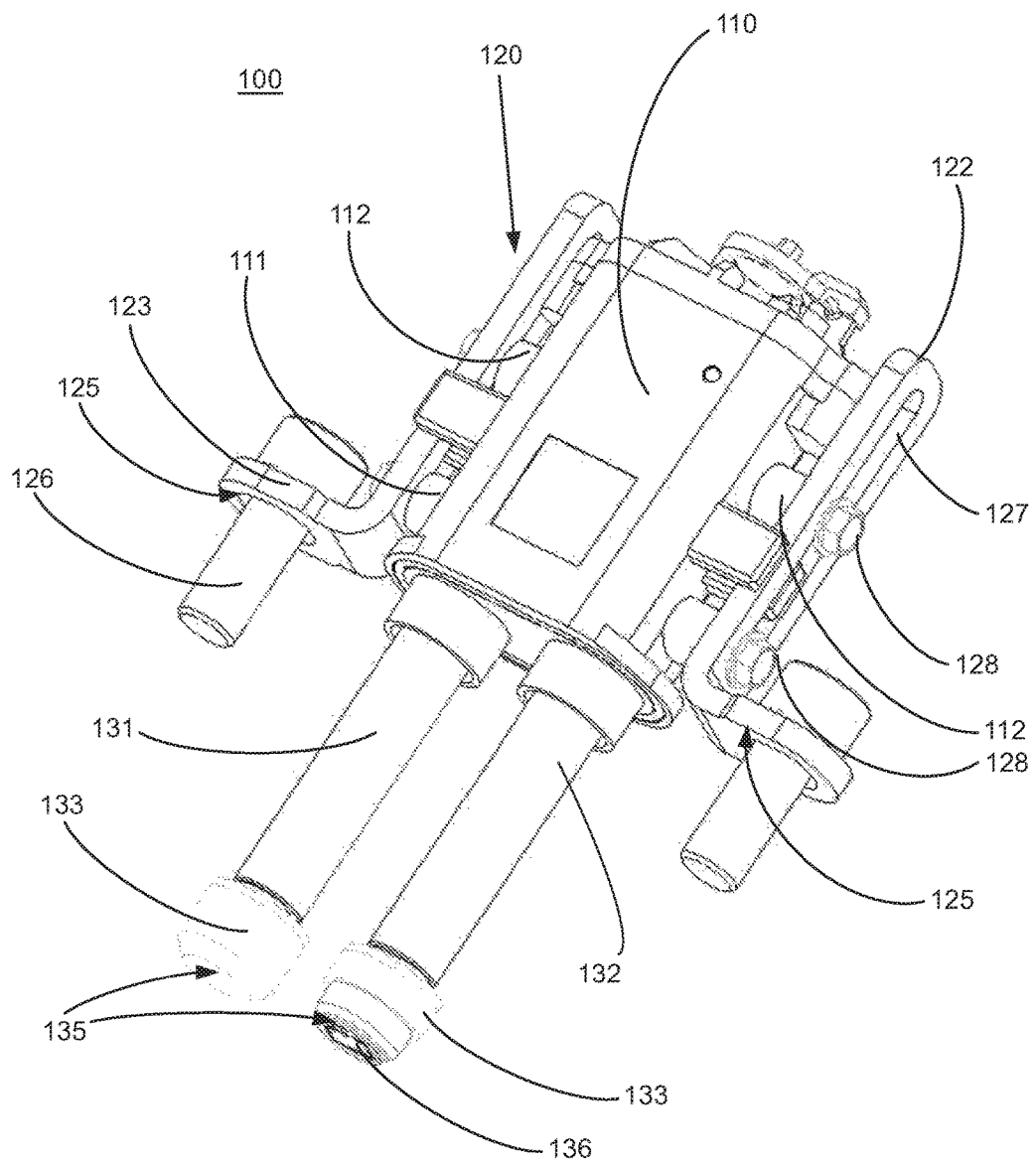
FIG. 1A shows a perspective of an example of a sensor unit according to the invention, with sensor-holding portions of the unit in an extended position relative to a main body of the unit.

FIG. 1A shows an example of a sensor unit according to the invention. The sensor unit 100 has a main body 110, which houses electronics of the unit, and a mounting bracket 120 at either side of the main body, to enable the unit to be attached to a component of a bearing assembly. Each mounting bracket has an arm portion 122 and an attachment portion 123, which extends at right angles from the arm portion. An attachment surface 125 is defined on each bracket which, in use of the device, will bear against a surface on the bearing assembly component. In the depicted example, the attachment portion 123 of each bracket 120 has an opening for receiving a bolt 126 (see FIG. 1B). Attachment by magnetic means is also possible.

Figure 1B:
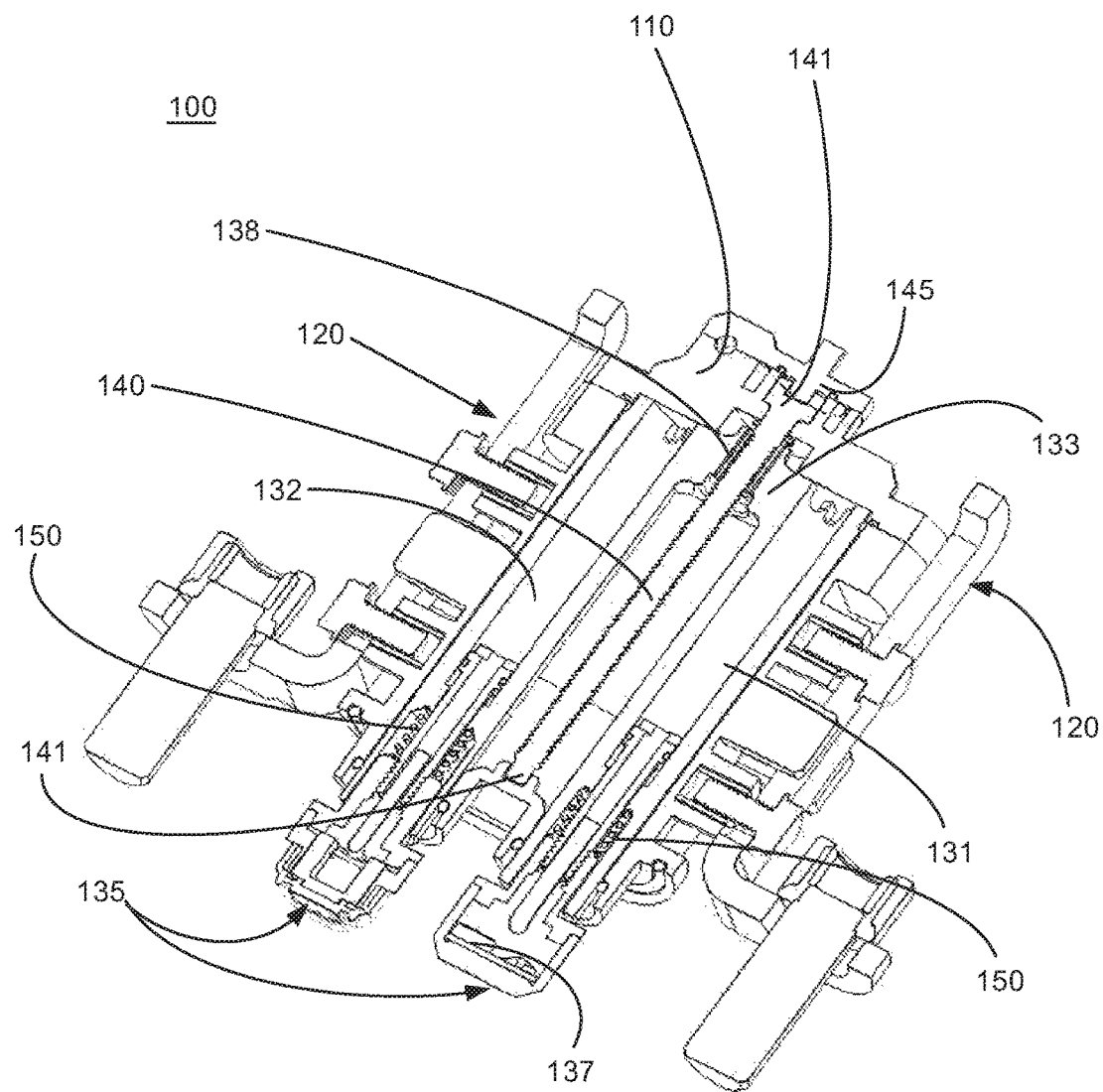
FIG. 1B shows a cut perspective view of the unit, with sensor-holding portions in a retracted position.

The unit 100 further provides a sensor holder which, in the depicted example, is constituted by first and second extendable legs 131, 132 that extend from the main body 110 in a longitudinal direction. Each leg has a foot portion 133, comprising a measurement surface 135 on an underside of the foot and at least one sensor. In use of the sensor unit 100, the measurement surface 135 of each leg is configured to be in contact with a bearing ring of the bearing assembly. In the depicted example, a piezo strain sensor 136 is provided on the measurement surface 135 of the second extendable leg 132, while the foot portion of first extendable leg 131 houses a sensor package comprising a temperature sensor, a vibration sensor and an acoustic emission (AE) sensor 137 (see FIG. 1B). Advantageously, each foot portion 133 can be spring loaded relative to the corresponding leg 131, 132, so that the measurement surface 135 is preloaded during use of the sensor unit. In the depicted example, as can be seen in FIG. 1B, a coil spring 150 is provided between each leg and its corresponding foot portion.

The sensors are connected to a circuit board that is housed within the main body 110. In the depicted example, the circuit board receives power via a connector, which can also be used to transmit data from the sensors in 136, 137 in a wired manner. Wireless data transmission is also possible.

The extendable legs 131, 132 are adjustable in length such that the position of the measurement surface 135 is adjustable in longitudinal direction relative to the sensor unit main body 110. FIG. 1a shows the sensor unit in a position where the legs 131, 132 are in a fully extended position. A cut perspective view of the unit, with legs retracted, is shown in FIG. 1B.

The first and second legs 131, 132 are connected by a bar 133 that is housed within the sensor unit main body 110. In retracted position, at least a portion of each leg is also accommodated within the main body. The connecting bar 133 provides a threaded opening 138, for engaging with a screw 140 that is also accommodated within the main body 110. A tip 141 of the screw 140 bears against an inner surface of the main body, while the screw head 142 extends outside of the main body. The screw is axially retained so as to prevent movement of the screw 140 relative to the main body 110 in both axial directions. Rotation of the screw therefore causes linear displacement of the connecting bar 133 enabling the first and second legs 131, 132 to be extended from the main body 110. When the desired extension has been achieved, the position of the screw may be secured by a lock cover 145, which is screwed to the main body 110. Suitably, the lock cover 145 has a protrusion that first into a recess, e.g. hex socket, in the screw head 142.

The provision of a sensor unit having a measuring surface that is adjustable in longitudinal direction is one of the means by which the sensor unit can be adapted for mounting on different types of bearing arrangements. The position of the attachment surface 125 of each bracket is also adjustable relative to the main body of the sensor unit.

Referring again to FIG. 1A, it can be seen that in the depicted example, the arm 122 of the each bracket 120 provides a longitudinal slot 127. Longitudinally spaced threaded inserts 111, 112 are provided at each side of the main body 110, for receiving screws 128 that fix each bracket to the main body. The slot 127 has a width that is only slightly larger than a shank of the fixing screws 128, and is smaller than a head of the fixing screws. The slot 127 enables a continuous linear adjustment of the bracket arm 122 relative to the main body of the sensor unit, such that the position of the attachment surface 125 can be adapted depending on the application.

Figure 2:
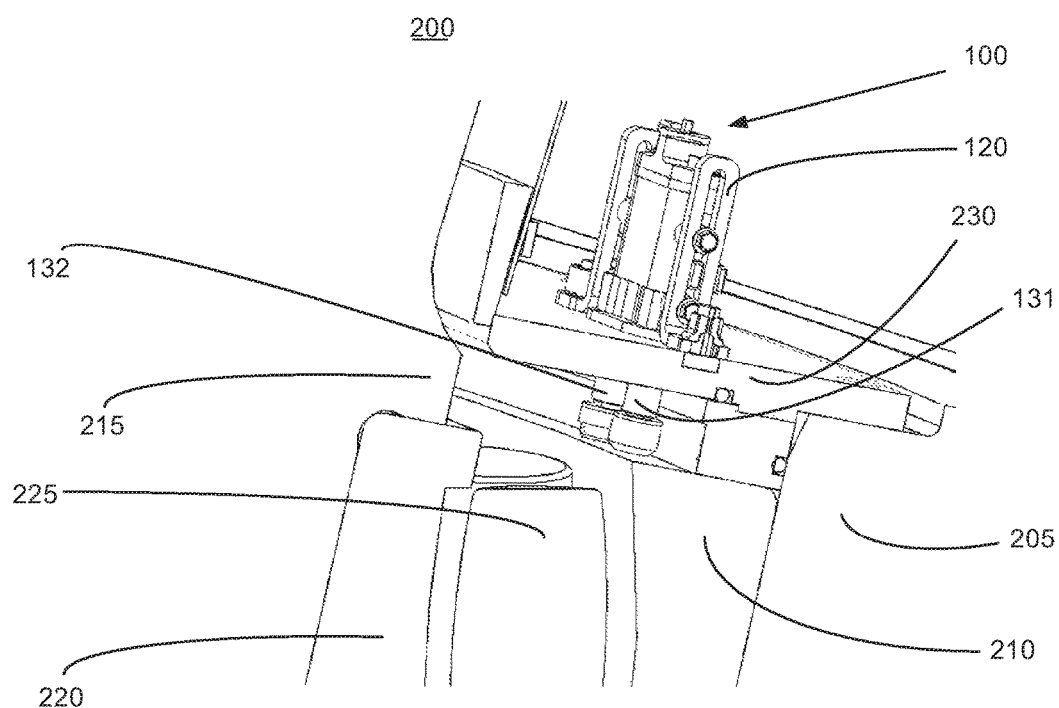
FIG. 2 shows a cut perspective view of part of a first example of a bearing assembly provided with a sensor unit according to the invention.

An example of an application is shown in FIG. 2. A cut perspective view of part of a bearing assembly 200 is depicted, comprising a spherical roller bearing having an inner ring 210, an outer ring 220 and two sets of spherical rollers, whereby only one roller set 225 is depicted. The bearing supports a main shaft 205 of a wind turbine relative to a housing 215. The assembly is further provided with a seal carrier ring 230, which is mounted in connection with the shaft 205.

The assembly 200 is further provided with a sensor unit 100 according to the invention, such as depicted in FIGS. 1*a* and 1*b*. The sensor unit is mounted to an axially outer surface of the seal carrier ring 235. The attachment portion of each mounting bracket 120 is bolted to the seal carrier ring, which is provided with an axially extending through hole for each extendable leg 131, 132 of the unit. During mounting, the extendable legs of the sensor holder are extended until the measurement surface makes contact with a side face of the bearing inner ring 210. The unit is thus securely mounted to the assembly, without the need to drill attachment holes in the bearing ring.

Figure 3:
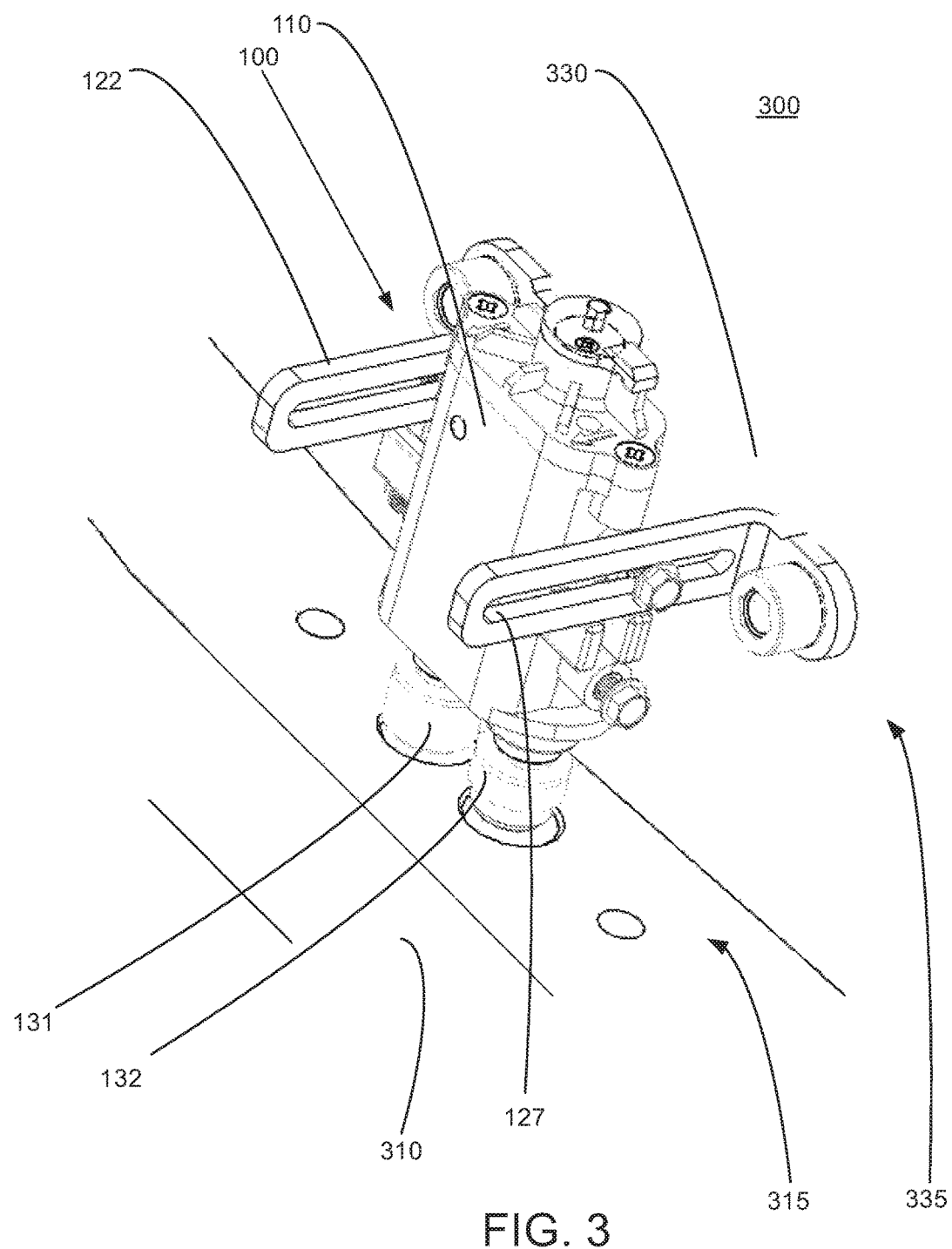
FIG. 3 shows a perspective view of part of a second example of a bearing assembly provided with a sensor unit according to the invention.

In the depicted application, the sensor unit 100 is mounted to the assembly 200 in a first attachment position, whereby the measurement surface and attachment surface of the unit lie on parallel planes. In other applications, a different attachment position is desirable. An example of a further bearing assembly comprising a sensor unit according to the invention mounted in a second attachment position, in which the measurement surface and attachment surface lie on perpendicular planes, is shown in FIG. 3.

The assembly 300 provides a bearing and a clamping ring 330 which bears in axial direction against a side face of an inner ring 310 of the bearing. The clamping ring has a smaller diameter than the bearing inner ring, such that a radially outer portion of the clamping ring 330 is in axial abutment with a radially inner portion of inner ring side face. The sensor unit 100 is mounted such that the measurement surface of the first and second extendable legs 131, 132 are in contact with a radially outer portion 315 of the side face. The unit is bolted to a cylindrical outer surface 335 of the clamping ring 330, whereby the arm 122 of each mounting bracket is fixed to the main body 110 with a transverse orientation, perpendicular to the longitudinal direction in which the legs are extendable.

The position of the attachment surface of each mounting bracket is adjustable in transverse direction relative to the main body, by means of the slot 127 in each arm. In turn, this enables the radial position of the measurement surface to be optimally adjusted.

Figure 4:
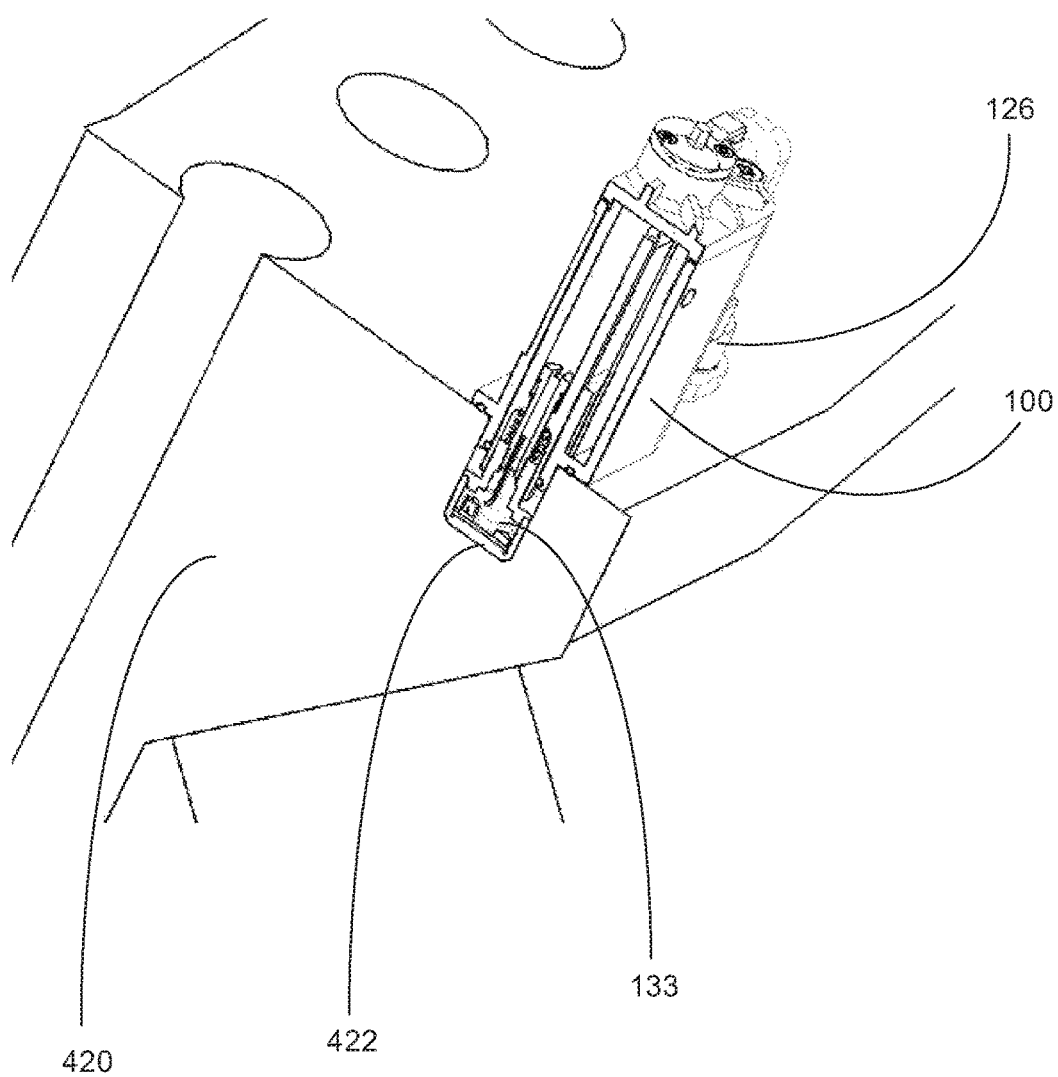
FIG. 4 shows a cut perspective view of part of a third example of a bearing assembly provided with a sensor unit according to the invention.

A sensor unit according to the invention can thus be in secure contact with a bearing ring, without the need to drill holes in the bearing ring, in a variety of applications. The unit can also be mounted directly to a bearing ring using magnets, or via bolts in application where the drilling of holes is permissible. An example of such an application is depicted in FIG. 4, which shows a cut perspective view of part of a taper roller bearing. An outer ring 420 of the bearing provides a recess 422 for accommodating the foot portion 133 of each extendable leg of a sensor unit 100 according to the invention. Further holes are drilled in the ring 420 for attachment bolts 126.

The invention claimed is:

1. A sensor unit for a bearing, comprising
a main body,
a sensor holder, and
one or more mounting brackets, wherein
the sensor holder has a measurement surface in a first plane and includes at least one sensor for measuring an operating parameter of the bearing when the measurement surface is in contact with a component of the bearing, wherein each mounting bracket provides an attachment portion having an attachment surface, wherein the sensor unit, is configured to be in contact with a component of the bearing or a component of a bearing assembly that includes the bearing,
the sensor holder includes one or more extendable legs, which are extendable in a longitudinal direction perpendicular to the first plane, such that the measurement surface is adjustable in longitudinal direction relative to the main body; and
the one or more mounting brackets are linearly movable and pivotably relative to the main body, such that:
the sensor unit has a first attachment position, in which the measurement surface and the attachment surface lie on parallel planes and the attachment surface is adjustable in longitudinal direction relative to the main body; and has a second attachment position in which the measurement surface and attachment surface lie in perpendicular planes and the attachment surface is adjustable in a transverse direction relative to the main body of the sensor unit.

2. The sensor unit of claim 1, wherein each extendable leg has a foot portion that comprises a measurement surface and one or more sensors selected from a temperature sensor, a vibration sensor, an acoustic emission sensor and a deformation sensor.

3. The sensor unit of claim 1, further comprising at least one spring that is compressible in longitudinal direction and configured such that the measurement surface is spring loaded.

4. The sensor unit of claim 1, wherein a portion of each extendable leg of the sensor holder is housed with the main body of the sensor unit when the sensor holder is in a partially extended or non-extended position.

5. The sensor unit of claim 4, further comprising a screw for extending and retracting the sensor holder, whereby the sensor holder comprises a threaded opening for engaging with the screw.

6. The sensor unit of claim 1, wherein each of the one or more mounting brackets comprises an arm from which the attachment portion extends at an angle of about 90 degrees, wherein the main body comprises at least one threaded hole for enabling the arm to be screwed to the main body.

7. The sensor unit of claim 6, wherein the arm of each mounting bracket comprises a longitudinal slot.

8. The sensor unit of claim 1, wherein the attachment portion of each mounting bracket comprises a bolt-receiving opening.

9. The sensor unit of claim 1, wherein the attachment portion of each mounting bracket comprises a magnet.

10. The sensor unit of claim 1, wherein the main body of the sensor unit houses a circuit board to which the one or more sensors are connected.

11. A bearing assembly comprising:
a sensor unit having;
a main body,
a sensor holder, and
one or more mounting brackets, wherein
the sensor holder has a measurement surface in a first plane and includes at least one sensor for measuring an operating parameter of the bearing when the measurement surface is in contact with a component of the bearing, wherein each mounting bracket provides an attachment portion having an attachment surface, wherein the sensor unit, is configured to be in contact with a component of the bearing or a component of a bearing assembly that includes the bearing, the sensor holder includes one or more extendable legs, which are extendable in a longitudinal direction perpendicular to the first plane, such that the measurement surface is adjustable in longitudinal direction relative to the main body; and the one or more mounting brackets are linearly movable and pivotably relative to the main body, such that:

the sensor unit has a first attachment position, in which the measurement surface and the attachment surface lie on parallel planes and the attachment surface is adjustable in longitudinal direction relative to the main body; and has a second attachment position in which the measurement surface and attachment surface lie in perpendicular planes and the attachment surface is adjustable in a transverse direction relative to the main body of the sensor unit.

12. The bearing assembly of claim 11, further comprising a bearing ring and a further ring arranged at an axial distance from the bearing ring, wherein the further ring is provided with at least one through hole that extends from an axially outer side to an axially inner side of the thereof, through which the sensor holder extends, such that the measurement surface of the sensor unit bears against an axial side face of the bearing ring, while the attachment surface of the one or more mounting brackets bears against the axially outer surface of the further ring.

13. The bearing assembly of claim 11, further comprising the sensor unit being mounted to a side face of a bearing ring, wherein the bearing ring comprises at least one recess into which the sensor holder extends, such that the measurement surface of the sensor unit is in contact with a bottom surface of the recess and the attachment surface of the one or more mounting brackets is in contact with the bearing ring side face.

14. The bearing assembly of claim 11, further comprising a bearing ring and a clamping ring having a radially outer portion in axial abutment with a radially inner portion of the bearing ring, wherein the measurement surface of the sensor unit is in contact with a side face of a radially outer portion of the bearing ring, while the attachment surface of the one or more mounting brackets is in contact with a cylindrical outer surface of the clamping ring.

* * * * *